3,636,198
VENTURICIDIN B AND X AND PROCESS FOR THEIR MANUFACTURE
Hans Zaehner, Tubingen, Germany, and Walter Keller, Dubendorf-Zurich, Switzerland, assignors to Ciba Corporation, New York, N.Y.
Filed June 25, 1968, Ser. No. 739,713
Claims priority, application Switzerland, June 30, 1967, 9,324/67; Dec. 20, 1967, 17,886/67
Int. Cl. A61k 27/00
U.S. Cl. 424—122                                    9 Claims

ABSTRACT OF THE DISCLOSURE

Venturicidin B and/or X useful especially as antifungal agents and process for their manufacture.

The subject of the invention is the manufacture of two new antibiotics which are subsequently designated Venturicidin X and Venturicidin B, and of their derivatives.

The new antibiotics are produced on culturing a new strain of streptomyces which is being kept in our laboratories and the University of Tübingen, Institute for Microbiology, under designation Tü 342. It has also been deposited in the United States Department of Agriculture, Peroria, Ill., under the designation NRRL 3399.

The strain Tü 342 was isolated from a sample of soil found in the vicinity of Koeoussa, Guinea. According to the type-determining characteristics [cf. Hütter et al., Arch. f. Mikrobiol. 39, 173 (1961)] it belongs to the type of Streptomyces aureofaciens Duggar 1948. It is characterized by the following characteristics: (1) The spores are ellipsoidal, of size 0.6 to 0.9 x 0.8 to 1.4µ; they have a smooth surface; (2) the air mycelium is initially white and subsequently greyish-brown to ashen grey (cinereus); (3) the spore chains are monopodially branched, in open, loose and irregular spirals of 4 to 6 turns; (4) no melanine-like pigment is formed on nutrients containing peptone.

The optimum growth temperature for strain Tü 342 is at 33 to 37° C., whilst it is 27–30° C. for other strains of the type S. aureofaciens.

In addition to the antibiotics Venturicidin X and B the strain S. aureofaciens produces the known antibiotic "Venturicidin" (=antibiotic AA 368, cf. German published specification 1,184,458), which is subsequently designated "Venturicidin A." The antibiotics can be separated by, for example, Craig distribution and/or chromatography on silica gel. Furthermore, as described below, Venturicidin A can be converted into Venturicidin B.

In order to manufacture the antibiotic Venturicidin X and/or B the strain S. aureofaciens Tü 342 or another strain forming Venturicidin X and/or B is cultured in an aqueous nutrient solution, containing a source of carbon and nitrogen as well as inorganic salts, under aerobic conditions, until the solution shows a significant antibiotic effect, and the antibiotics Venturicidin X and/or B are thereafter isolated and, if desired, any Venturicidin A also formed is converted into Venturicidin B and, if desired, the resulting antibiotics are converted into their derivatives.

The following may for example be used as carbon and nitrogen sources in the culture: glucose, saccharose, fructose, starch, mannitol, amino-acids, for example glycine, peptides, proteins and their degradation products such as peptone or tryptone, meat extracts, water-soluble constituents of cereal grains such as maize or wheat, distillation residues for the manufacture of alcohol, corn steep liquor, yeast, seeds, especially seeds of rape and soya and cotton plants, ammonium salts and nitrates.

Amongst inorganic salts, the nutrient solution may for example contain chlorides, carbonates, sulfates, nitrates and phosphates of alkali and alkaline earth metals, of magnesium, zinc, manganese and iron.

The culture is carried out under aerobic conditions, for example in a static surface culture, or preferably submerged with shaking or stirring with air or oxygen in shaking flasks or the known fermenters. Temperatures of between 27 and 37° C. are suitable. The nutrient solution generally shows a significant antibacterial effect after 24 hours. The culture is preferably carried out in several stages, that is to say a pre-culture is first prepared in a liquid nutrient medium, and this is then trans-inoculated into the actual production medium, for example in the ratio of 1:10. The pre-culture is for example obtained by trans-inoculating a spore mycelium obtained by about 14 days' growth on a solid nutrient into a liquid medium and allowing it to grow for 48 hours.

The antibiotics are isolated from the culture filtrate by methods which are in themselves known, taking into account the chemical, physical and biological properties of the antibiotics. Botrytis cinerea is particularly suitable as a test organism for testing the antibiotic effect in the individual stages of isolation—and also in the culture medium. The hyphae of this micro-organism are morphologically modified by the antibiotics (strong branching from a certain point onwards, so that structures resembling witches'-brooms are produced). The test is for example carried out as a plate diffusion test in the following manner:

A circular area of 5 mm. diameter in the centre of malt agar plates is inoculated with Botrytis cinerea and the plates are incubated for 2–3 days at 24° C. During this time the mycelium grows to a size of 20–30 mm. diameter. A solution of the substance to be tested is applied by means of filter discs of 6 mm. diameter at about 5 mm. distance from the edge of the mycelium. The plates are then incubated for 24–36 hours at 24° C. In the case of active solutions a morphological change of the hyphae can be found up to a distance of 24 mm. from the filter disc. Solutions having a concentration of 10 γ/ml. of the antibiotics still produce clearly modified hyphae.

In contrast to Venturicidins A and B, which are glycosides of 2-desoxy-D-rhamnose (Venturicidin B) and of 3-O-carbaminyl-2-desoxy-D-rhamnose (Venturicidin A), the antibiotic Venturicidin X is not a glycoside. It does not contain a sugar. It is also not identical with the aglycone of Venturicidin A and B ($C_{36}H_{60}O_8$). Venturicidin X has hitherto not been obtained as a crystalline substance but as an amorphous powder which is unitary in a thin layer chromatogram. It is a lipophilic neutral colorless substance, which is soluble, inter alia, in methanol, ethanol, acetone, ethyl acetate, chloroform and methylene chloride.

Elementary analysis shows (percent): C=66.35; H=9.18; O=24.90.

The molecular weight (vapour pressure osmometry method, in methylene chloride) was determined as 701. These data can be reconciled with the overall formula $C_{39}H_{64}O_{11}$ (molecular weight 709, C=66.07; H=9.10; O=24.83) and $C_{39}H_{64}O_{10}$ (molecular weight 693; C=67.60; H=9.31; O=23.09). The optical rotation $$[\alpha]^{23}_{578} \text{ is } -61.5°$$

(c.=1% in chloroform).

The infra-red spectrum in potassium bromide shows bands at, inter alia, 3480, 2965, 2942, 2875, 1702, 1643, 1452, 1382, 1300 (shoulder), 1279, 1232, 1222, 1184, 1169 (shoulder), 1129, 1095, 1052, 984, 910, 880, 870, 850, 780, 752, and 718 cm.$^{-1}$ (cf. FIG. 1).

The nuclear magnetic resonance spectrum in deuterochloroform, 60 mc., is shown in FIG. 2.

The ultra-violet spectrum in fine spirit shows the following maxima: λ=220 nm. (log ε=4.47; shoulder); λ=226 nm. (log ε=4.50); λ=232.5 nm. (log ε=4.47); λ=241 nm. (log ε=4.25); λ=approx. 295 nm. (log ε=2.53, shoulder).

In a thin layer chromatogram on silica gel, using ethyl acetate as the running agent, the $R_f$-value is 0.80, and is thus significantly greater than that of Venturicidins A and B (Venturicidin A: 0.49; Venturicidin B: 0.41).

On hydrogenating Venturicidin X with palladium charcoal in methanol about 2 mols of hydrogen are taken up. The Tetrahydro-Venturicidin X forms colorless crystals of melting point 156–157° C. Elementary analysis shows: C=67.39; 67.11%; H=9.91; 9.89%; the molecular weight was determined as 765 (vapour pressure osmometry method in ethyl acetate). These data can best be reconciled with the overall formula $C_{39}H_{68}O_{10}$ (calculated: C=67.21; H=9.84; molecular weight 697). The overall formula of Venturicidin X is therefore probably $$C_{39}H_{64}O_{10}.$$

The optical rotation of the tetrahydro-derivative is $$[\alpha]_{578}^{23} = -48.5°$$

(c.=0.968% in chloroform).

The ultra-violet spectrum in fine spirit shows maxima at λ=212 nm. (log ε=2.88) and λ=275 nm. (log ε=2.20).

The infra-red spectrum in potassium bromide shows bands at, inter alia: 3510, 3465, 3400 (shoulder), 2960, 2940, 2875, 1732, 1708, 1697, 1625, 1457, 1411, 1395, 1381, 1370, 1339, 1270, 1242, 1225, 1215, 1190, 1170 (shoulder), 1133, 1089, 1052 (shoulder), 1029, 1011, 989, 933, 908, 882, 849, 839, 808, 796, 773, 746, 729, 695, and 593 cm.$^{-1}$ (cf. FIG. 3).

The nuclear magnetic resonance spectrum in $CDCl_3$ of Tetrahydro-Venturicidin X is reproduced in FIG. 4.

Venturicidin X and its tetrahydro-derivative can be acylated in the usual manner, for example with acid halides or especially acid anhydrides, for example those of aliphatic, araliphatic, aromatic or heterocyclic carboxylic acids, above all lower fatty acids, such as for example acetic acid.

On acetylating the Tetrahydro-Venturicidin X the acetyl derivative is obtained as a colorless oil. The nuclear magnetic resonance spectrum of this compound in deuterochloroform is represented in FIG. 5. The infra-red spectrum in chloroform shows bands at, inter alia, 3460, 1733, 1705 (shoulder), 1457 and 1370 cm.$^{-1}$. The magnetic resonance spectrum in $CDCl_3$ displays signals for example at δ=2.02 p.p.m. (s, 3 H); 2.08 p.p.m. (s, about 9 H).

On acid methanolysis about 5 reaction products are obtained, of which 3 are obtained as colorless oils in a chromatographically pure form. Methylglycosides are not formed during this process. The nuclear magnetic resonance spectra of the products show $OCH_3$-signals which may have been produced by methanolysis of a lactone ring. The presence of a (macrocyclic) lactone ring is also indicated by the signal δ 5.0 p.p.m. corresponding to a —COO—CH— group, which occurs in the unhydrogenated and in the hydrogenated Venturicidin X. The 3 other signals in this region, which are only shown by the unhydrogenated product, relate to hydrogen atoms on double bonds. The singlet at δ 2.05 p.p.m. (FIG. 2) is attributed to a C-methyl group on a double bond, since this signal is also absent in the spectrum of the hydrogenation product. In conjunction with the ultra-violet spectrum, which corresponds to that of a conjugated diene, it may be assumed that one of the two partial Formulae Ia and Ib is a structural component.

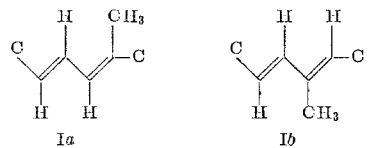

Ia          Ib

In addition to this diene system, a non-conjugated keto group is present (shoulder at about 295 nm. in the ultra-violet spectrum of Venturicidin X and about 275 nm. in the hydrogeneration product). The nuclear magnetic resonance spectra further show the presence of about 10 methyl groups, which indicate the presence of a C-skeleton similar to that of the classical macrolide of the erythromycin type.

The aforementioned patent gives the formula $$C_{43}H_{71}NO_{12}$$

for Venturicidin A. The structure of the compound had not been explored. In connection with the investigation of the new antibiotic Venturicidin B, the structure of fragments of Venturicidin A was determined. For Venturicidin B, the formula $C_{42}H_{70}O_{11}$ can be inferred from analysis. Accordingly, Venturicidin B is Venturicidin A minus CONH. The IR spectra (FIGS. 6 and 8) gave rise to the assumption that Venturicidin A is a carbamic acid ester of Venturicidin B, because the maximum at 1605 cm.$^{-1}$ is not present in Venturicidin B. This agrees with the fact that Venturicidin B yields a tri-O-acetyl derivative, whereas Venturicidin A only gives a Di-O-acetyl derivative. This assumption was confirmed by the successful isolation of a sugar degradation product from each of Venturicidins A and B and the determination of their interrelation and their complete constitution. Acid-catalyzed methanolysis under mild conditions of Venturicidin A gave, inter alia, a crystalline methyl glycoside, $$C_8H_{15}NO_5 \quad (I)$$

Hydrolysis with barium hydroxide resulted in the elimination of the carbamoyl group, and methyl glycoside $$C_7H_{14}O_4 \quad (II)$$

of a didesoxyhexose was obtained.

For the methylglycoside $C_8H_{15}NO_5$ the following constitution and configuration were ascertained from the nuclear magnetic resonance spectrum:

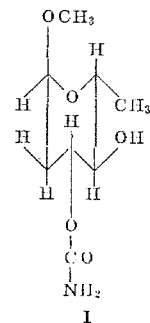

I

For this purpose the identification of the various signals was supported by spin-spin-splitting (cf. Example 1). The signal at δ 4.86 p.p.m. clearly belongs to the proton in position 3. Its chemical shift corresponds to that of a hydrogen atom beside an acyloxy group. The signal at δ 3.21 p.p.m. is due to the hydrogen atom H–4. C–4 must therefore carry the free hydroxyl group, whereas C–3 carries the carbamoyl radical. The signal of H–1 (δ 4.73 p.p.m.) is a double doublet with the small coupling constants $J_{1e,2a}$=3.8 c.p.s. and $J_{1e,2e}$=1.5 c.p.s. This explains, on the one hand, the equatorial position of H–1 and, on the other, the location of the $CH_2$ group in position 2, which also follows from the spin-spin-splitting. The coupling constants $J_{2a,3}$=11.5 cp.s.i., $J_{3,4}$=9 c.p.s. and $J_{4,5}$=9 c.p.s. prove the axial position of the hydrogen atoms on C-3, C-4 and C-5. The doublet at δ 1.33 p.p.m. for a CH₃—CH group shows that the substance is a 6-desoxy sugar. The degradation product from Venturicidin A is thus a 3-O-carbamoyl-2-desoxy-rhamnose. Hydrolysis with barium hydroxide yields the methylglycoside α-methyl-2-desoxy-D-rhamnoside $C_7H_{14}O_4$ of the constitution and configuration II

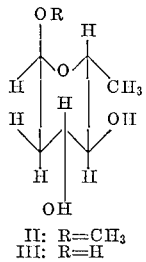

II: R=CH₃
III: R=H

The same compound is obtained when Venturicidin B is methanolyzed.

Hydrolysis of II yields the free sugar III which in water displays an optical rotation $[\alpha]_D^{23}=+19.9°$ (final value after 90 minutes).

The aglycons of Venturicidin A and B have not so far been obtained in pure form. Thin-layer chromatographic behavior and nuclear magnetic resonance spectrum indicate that two antibiotics contain the same aglycon.

The antibiotics Venturicidin B and Venturicidin X have a good antimicrobial, especially anti-fungus activity superior to that of Venturicidin A. Table 1 below shows a spectrum of the effects of Venturicidin A, B and X on various fungi. The inhibiting effect (diameter of inhibition zone in mm.) of various antibiotic concentrations on these micro-organisms in the plate diffusion test (diameter of the filter discs impregnated with the antibiotic solution, 6 mm.) is shown. Figures in brackets denote incomplete inhibition; dashes mean that the relative experiment has not been made.

The table also shows that in the highest concentrations tested (10 mg./ml.) the antibiotics are ineffective against yeast. This is of importance for the use of Venturicidin X and/or B as fungicides in viticulture.

The residues, in the grapes, of known organic fungicides used in viticulture are of the order of 10 p.p.m., whereas 3–5 p.p.m. already lead to delayed fermentation (Vogeler and Goeldener, Zeitschrift für Obst- und Weinbau, 103, 494–504, 1967). Since the threshold of activity of Venturicidin X and B against yeast is much higher, the use of these antibiotics in viticulture is of advantage.

TABLE 1

Activity spectrum of Venturicidin A, B and X

| Fungi tested | | Diameter of inhibitions zone at the indicated concentrations in mg./ml. | | | |
|---|---|---|---|---|---|
| | | 10 | 1 | 0.1 | 0.01 |
| Mucor Tü 285 parvisporus | A | (8) | (8) | (8) | ---- |
| | B | 11.5 | (10) | (8) | ---- |
| | X | 16 | 16 | (12) | ---- |
| Mucor Tü 181 mucedo | A | 10.5 | 9.5 | 8 | ---- |
| | B | 14 | 10 | 7 | ---- |
| | X | 25 | 23 | 14.5 | ---- |
| Mucor Tü 284 michei | A | (7.5) | (7) | ---- | ---- |
| | B | (7.5) | (7) | ---- | ---- |
| | X | 18 | 17 | 12 | ---- |
| Zygorhynchus Tü 190 Moelleri | A | ---- | ---- | ---- | ---- |
| | B | (9) | (8) | ---- | ---- |
| | X | 15 | 14 | (8) | ---- |
| Trichophyton Tü 297 mentagrophytum | A | ---- | ---- | ---- | ---- |
| | B | 20 | 15 | ---- | ---- |
| | X | ---- | ---- | ---- | ---- |
| Trichophyton Tü 298 rubrum | A | 12 | 12 | 12 | ---- |
| | B | (10) | (11) | (7) | ---- |
| | X | 25 | 20 | ---- | ---- |
| Paecilomyces Tü 137 varioti | A | (11) | (10) | (7) | ---- |
| | B | (15) | (12) | (10) | ---- |
| | X | 27 | 26 | 14 | ---- |
| Byssochlamys Tü 271 nivea | A | (17) | (16) | (14) | ---- |
| | B | 22 | 16 | 15 | ---- |
| | X | 33 | 24 | 15 | ---- |

| Fungi tested | | Diameter of inhibitions zone at the indicated concentrations in mg./ml. | | | |
|---|---|---|---|---|---|
| | | 10 | 1 | 0.1 | 0.01 |
| Aspergillus Tü 155 terreus | A | ---- | ---- | ---- | ---- |
| | B | (11) | (11) | (11) | ---- |
| | X | 17 | 16 | (10) | ---- |
| Endothia Tü 163 parasitica | A | (15) | (12) | (10) | ---- |
| | B | (19) | (15) | (12) | ---- |
| | X | 26 | 21 | 12 | ---- |
| Cordyceps Tü 255 militaris | A | (14) | (10) | (8) | ---- |
| | B | 19 | 14 | 8 | ---- |
| | X | 31 | 28 | 17 | ---- |
| Verticillium Tü 264 coccorum | A | (9) | (11) | (11) | ---- |
| | B | (14) | (12) | (12) | ---- |
| | X | (21) | (19) | 9 | ---- |
| Leptosphaerulina Tü 281 oryzae | A | ---- | ---- | ---- | ---- |
| | B | ---- | ---- | ---- | ---- |
| | X | 16 | 14 | ---- | ---- |
| Botrytis Tü 157[1] cinera | A | 31 | 24 | 24 | 22 |
| | B | 39 | 32 | 32 | 29 |
| | X | 40 | 40 | 31 | 26 |
| Beauveria Tü 253 bassiana | A | 11 | (11) | (11) | (9) |
| | B | 22 | 15 | (11) | (8) |
| | X | 35 | ---- | 25 | 14 |
| Penicillium Tü 287 avellaneum | A | 9 | 8 | 8 | ---- |
| | B | 14 | 10 | (9) | ---- |
| | X | 22 | 20 | 12 | ---- |
| Keratinomyces Tü 534 | A | (10) | (10) | (8) | ---- |
| | B | (14) | (12) | (10) | ---- |
| | X | 21 | 19 | 16 | ---- |
| Pseudogymnoascus Tü 293 vinaceus | A | ---- | ---- | ---- | ---- |
| | B | ---- | ---- | ---- | ---- |
| | X | 22 | 20 | ---- | ---- |
| Saccharomyces cerevisiae | A | 0 | 0 | ---- | ---- |
| | B | 0 | 0 | ---- | ---- |
| | X | 0 | 0 | ---- | ---- |

[1] Tested according to Hütter et al., Arch. Mikr biol. 51, 1 (1965).

The new antibiotics may therefore be used for combating infections caused by fungi and also as additives to animal fodder, for the preservation of foodstuffs and as disinfectants, and furthermore for combating fungal diseases on live plants.

The antibiotics Venturicidin B and/or X may be used, for example, in the form of pharmaceutical preparations. These contain the antibiotic(s) mixed with a pharmaceutical organic or inorganic excipient suitable for enteral or parenteral use, especially for topical use. Suitable excipients are those substances which do not react with the new compound, such as for example gelatine, lactose, starch, magnesium stearate, vegetable oils, benzyl alcohols or other known medicinal excipients. The pharmaceutical preparations may for example be in the form of tablets, dragees, powders, suppositories or in a liquid form as solutions, suspensions or emulsions. They are optionally sterilized and/or contain auxiliary substances such as preservatives, stabilizers, wetting agents or emulsifiers. They may also further contain other therapeutically valuable substances.

When combating plant-pathogenic fungi, such as *Aspergillus niger, Alternaria tennis, Botrytis cinerea, Cercospora melonis, Didymella lycopersici, Fusarium nivale, Glomerella cingulata, Helminthosporium avenae*, etc., the antibiotic may be used in the form of a liquid preparation, for example as a solution, suspension or emulsion, or in a solid form as a granulate, dusting or scattering agent. Suitable materials for manufacturing directly sprayable solutions of the antibiotics are for example mineral oil fractions of high to medium boiling range, such as diesel oil or kerosene, coal tar oil and oils of vegetable or animal origin, as well as hydrocarbons, such as alkylated naphthalenes or tetrahydronaphthalene, optionally using xylene mixtures, cyclohexanols, ketones and furthermore chlorinated hydrocarbons such as trichlorethane and tetrachlorethane, trichlorethylene or trichlorobenzenes and tetrachlorobenzenes. Organic solvents whose boiling point is above 100° C. are advantageously used.

Aqueous application forms are particularly appropriately prepared from emulsion concentrates, pastes or wettable spraying powders by adding water. Possible emulsifiers or dispersing agents are non-ionic products, for example condensation products of aliphatic alcohols, amines or carboxylic acids having a long-chain hydrocarbon residue of about 10 to 20 carbon atoms with ethylene oxide, such as the condensation product of octadecyl alcohol and 25 to 30 mols of ethylene oxide, or that of soya fatty acid and 30 mols of ethylene oxide or that of technical oleylamine and 15 mols of ethylene oxide or that of dodecylmercaptan and 12 mols of ethylene oxide. Amongst the anionic emulsifiers which may be employed there may be mentioned: the sodium salt of dodecyl alcohol sulfuric acid ester, the sodium salt of dodecylbenzene-sulfonic acid, the potassium or triethanolamine salt of oleic acid or of abietic acid or mixtures of these acids, or the sodium salt of a petroleum-sulfonic acid. Possible cationic dispersing agents are quaternary ammonium compounds such as cetyl pyridinium bromide, or dihydroxyethyl benzyl dodecyl ammonium chloride.

In order to manufacture dusting and scattering agents, talc, kaolin, bentonite, calcium carbonate, calcium phosphate, but also charcoal, cork powder, wood flour and other materials of vegetable origin, may be employed as solid carriers. It is also very appropriate to manufacture the preparations in a granular form. The various application forms may be provided, in the usual manner, with additions of substances which improve the distribution, adhesion, rain resistance or penetrating power; fatty acids, resin, glue, casein or alginates may be mentioned as such substances.

The invention is described in the following examples.

EXAMPLE 1

(a) 300 ml. of a nutrient solution contained in a 2 liter Erlenmeyer flask and containing 20 g. of soya flour (full fat content) and 20 g. of mannitol per liter, whose pH was adjusted to 7.5 by means of potassium hydroxide solution before sterilization, are inoculated with an agar culture of *Streptomyces aureofaciens* Tü 342 and the suspension is incubated at 27° C. whilst shaking on a shaking machine. After about 48 hours the culture is transferred, in the ratio of 1:10, into a nutrient solution of the same composition contained in a fermenter. The mixture is again incubated at 27° C., with good aeration, for 24 hours. The test with *Botrytis cinerae*, described above, is used to check the activity in the culture and in all stages of working-up.

(b) The strain *Streptomyces aureofaciens* Tü 342 is cultured, in accordance with the procedure described, in a nutrient solution which per liter contains 20 g. of malt extract (about 50% solids content), 20 g. of distillers' solubles (maize dry slops), 5 g. of sodium chloride and 1 g. of sodium nitrate.

(c) The strain *Streptomyces aureofaciens* Tü 342 is cultered, in accordance with the procedure described, in a nutrient solution which per liter contains 20 g. of distillers' solubles, 20 g. of lactose, 5 g. of sodium chloride and 1 g. of sodium nitrate.

(d) The strain *Streptomyces aureofaciens* Tü 342 is cultured, in accordance with the procedure described, in a nutrient solution which per liter contains 10 g. of glucose, 5 g. of peptone, 3 g. of meat extract, 5 g. of sodium chloride and 10 g. of calcium carbonate. The pH is adjusted to 7.2 by means of potassium hydroxide solution before sterilization.

When the culture shows a significant antimicrobial effect, it is cooled and filtered under pressure with the addition of a filter aid, for example Hyflo-Supercel®. The filtrate is twice extracted with half the quantity of ethyl acetate with the pH remaining unchanged (about 7.5–7.8); hereupon the antibiotically active substances pass into the ethyl acetate. Significant quantities of the antibiotic are also present in the filter residue. They are obtained therefrom by repeated extraction with methanol. The methanolic extracts are greatly concentrated in vacuo, diluted with water and subsequently repeatedly extracted with ethyl acetate. After concentrating the ethyl acetate extracts from the culture filtrate and from the filter residues, an oily residue of 80–100 g. is obtained from 100 liters of culture liquid.

40 g. of this residue are pre-purified by means of a Craig distribution through 190 stages. The solvent system used for this purpose contains 0.75 liter of chloroform, 4 liters of methanol and 1 liter of water per 4.25 liters of carbon tetrachloride. The Venturicidins A, B and X become enriched in stages 75–130 (maximum in stage 100). These fractions are combined and evaporated to dryness in vacuo. 25 g. of a pale yellow powder are obtained. 21 g. of this substance are distributed through 600 stages, using the same solvent system. The Venturicidins are in stages 265–396. Evaporation in vacuo yields 5.1 of Venturicidin B and Venturicidin X from stages 265–308, 5.4 g. of Venturicidin B and Venturicidin X and Venturicidin A from stages 309–328 and 10.1 g. of Venturicidin A and Venturicidin X from stages 329–396. The substances show the following $R_f$-values in a thin layer chromatogram on silica gel F 254 (Merck ready-prepared plates) using ethyl acetate as the running agent (the spots are developed by spraying with concentrated sulfuric acid and heating to 140° C.): Venturicidin A: 0.49; Venturicidin B: 0.41; Venturicidin X: 080. All three mixtures of substances are chromatographed on columns of silica gel.

When the residue obtained on evaporation of the fractions 329–396 is chromatographed on 250 g. of silica gel (Merck) and eluted with 1.5 liters of chloroform+ethyl acetate (1:1), 1.85 g. of Venturicidin X are obtained as a yellowish, amorphous powder. It has the properties mentioned in the introductory portion of this specification.

After this elution, the residue is further eluted with 1 liter of ethyl acetate, and 5.27 g. of Venturicidin A obtained, which on crystallization from chloroform+ether forms colorless crystals. Melting point, 140–142° C. Optical rotation $[\alpha]_D^{23} = +119°$ (c.=0.5 in chloroform). IR spectrum in KBr, see FIG. 6. Nuclear magnetic resonance spectrum (60 mHz.) in $CDCl_3$, see FIG. 7.

In order to elucidate the structure of Venturicidin A, the following experiments were made:

(1) Di-O-acetyl-Venturicidin A 200 mg. of Venturicidin A are acetylated with 2 ml. of acetic anhydride and 0.6 ml. of pyridine for 16 hours at room temperature, then evaporated under reduced pressure. The residue is chromatographed over 20 g. of silica gel. Using ethyl acetate as eluant, 205 mg. of chromatographically unitary product are obtained which after three recrystallizations from acetone+petroleum ether yields colorless crystals melting at 169–171° C. Optical rotation $[\alpha]_D^{23} = +95°$ (c.=0.97 in chloroform). IR absorption spectrum in KBr: $\lambda_{max}$ 1748, 1715 (shoulder), 1608 cm.$^{-1}$; nuclear magnetic resonance spectrum in $CDCl_3$: inter alia 2.00 p.p.m. (s, 3 H), 2.06 p.p.m. (s, 3 H). For the rest, the spectrum does not differ substantially from that of Venturicidin A.

$C_{47}H_{75}NO_{14}$.—Calculated (percent): C, 64.29; H, 8.61; N, 1.60. Found (percent): C, 64.30; H, 8.80; N, 1.70.

(2) α-Methyl-3-O-carbamoyl-2-desoxy-D-rhamnoside (1)

20 ml. of 1.3 N-absoulte methanolic hydrochloric acid are added to a solution of 3.30 g. of Venturicidin A in 200 ml. of absolute methanol. The batch is allowed to stand at 20° C. for 6 hours, when thin-layer chromatographic analysis reveals the complete disappearance of the starting material. The solution is evaporated to dryness under reduced pressure at 25° C. The thin-layer chromatogram (ethyl acetate) shows an elongated brownish spot, with $R_f$ 0.6, and a sharp blue-gray spot, with $R_f$ 0.28. Separation is performed on 200 g. of silica gel. With ethyl acetate a total of 1.892 g. of amorphous, nonunitary fractions are obtained which are made up essentially of two compounds ($R_f$ 0.62 and 0.58). Ethyl acetate+methanol (8:2) gives 641 mg. of the compound with $R_f$ 0.28 which, after two recrystallizations from ether+petroleum ether and sublimation (100–110° C., high vacuum), forms colorless crystals melting at 146–149° C. Optical rotation, $[\alpha]_D^{23}=+137°$ (c.=1.47% in acetone); IR absorption spectrum in Nujol®: (OH) and $\nu$ (NH) 3400, 3350, 3290 and 3190 cm.$^{-1}$, $\nu$ (CO) 1715, 1620 cm.$^{-1}$. Nuclear magnetic resonance spectrum in CDCl$_3$ after treatment with D$_2$O (100 mHz.):

$\delta$ 1.33 p.p.m. (d, J=6.2, Hz., 3 H); 1.75 p.p.m. (m, $J_{2a,2e}$=13 Hz., $J_{2a,3a}$=11.5 Hz., $J_{2a,1e}$=3.8 Hz., H–2a); 2.18 p.p.m. (m, $J_{2e,2a}$=13 Hz., $J_{2e,3a}$=5.5 Hz., $J_{2e,1e}$=1.5 Hz.; H–2e); 3.21 p.p.m. (t, $J_{4a,3a}$=$J_{4a,5a}$=9 Hz.; H–4a); 3.30 p.p.m. (s, 3 H; OCH$_3$); 3.66 p.p.m. (dq, $J_{5a,6}$=6.2 Hz., $J_{5a,4a}$=9 Hz.; H–5a); 4.73 p.p.m. (dd, $J_{1e,2a}$=3.8 Hz., $J_{1e,2e}$=1.5 Hz.; H–1e); 4.86 p.p.m. (m, $J_{3a,2a}$=11.5 Hz., $J_{3a,2e}$=5.5 Hz., $J_{3a,4a}$=9 Hz.; H–3a).

Spin-spin-splittings:

| Irradiation at $\delta$ | Assignment | Decoupled signal $\delta$ multiplicity | Assignment |
| --- | --- | --- | --- |
| 1.33 p.p.m. | 3 H–6 | 3.66 p.p.m. d, J=9 Hz. | H–5a |
| 3.66 p.p.m. | H–5a | 1.33 p.p.m. s, 3H<br>3.21 p.p.m. d, J=9 Hz. | 3 H–6<br>H–4a |
| 3.21 p.p.m. | H–4a | 3.66 p.p.m.<br>4.86 p.p.m. dd, $J_{3,2a}$=11.5 Hz. $J_{3,2e}$=5.5 Hz. | H–5a<br>H–3a |
| 4.73 p.p.m. | H–1e | 1.75 p.p.m. dd, $J_{2a,2e}$=13 Hz. $J_{2a,3a}$=9 Hz.<br>2.18 p.p.m. dd, $J_{2e,2a}$=13 Hz. $J_{2e,3a}$=5.5 Hz. | H–2a<br>H–2e |

Mass spectrum.—Inter alia m/e 205 (M), 174 (M—OCH$_3$), 161 (M—CONH$_2$), 131 (M—OCH$_3$—CONH$_2$+H), 113 (131–H$_2$O), 104, 100 (base peake).

C$_8$H$_{15}$NO$_5$.—Calculated (percent): C, 46.82; H, 7.37; M, 6.83. Mols weight, 205. Found (percent): C, 46.80; H, 7.22; M, 6.88. Mols weight, 205. (Mass spectrum).

(3) Methyl-O-acetyl-O-carbamyl-2-desoxy-D-rhamnoside 250 mg. of the carbamate I are acetylated with 4 ml. of acetic anhydride and 1 ml. of pyridine as usual, and the crude product chromatographed on 30 g. of silica gel with ethyl acetate. The eluate (235 mg.) is distilled in a high vacuum and then solidifies slowly to form colorless crystals melting at 100–110° C. The nuclear magnetic resonance spectrum shows that the substance is a mixture of at least three isomers: 3 doublets (J about 6.5 Hz.) at $\delta$ 1.17, 1.23 and 1.35 p.p.m.; all of about the same intensity; acetyl signals at $\delta$ 2.00 and 2.07 p.p.m.; OCH$_3$—singlets at $\delta$ 3.33, 3.38 and 3.49 p.p.m.

C$_{10}$H$_{17}$NO$_6$.—Calculated (percent): C, 48.58; H, 6.93; N, 5.66. Found (percent): C, 48.53; H, 6.92; N, 5.61.

(4) α-Methyl-2-desoxy-D-rhamnoside (II)

(a) From carbamate I.—220 mg. of carbamate I in 9 ml. of water are hydrolyzed with 6.1 ml. of saturated barium hydroxide solution for 48 hours at room temperature. The barium carbonate which separates is filtered off and the excess barium hydroxide precipitated by introducing CO$_2$. The filtrate is evaporated under reduced pressure and the residue chromatographed on 20 g. of silica gel. With ethyl acetate 50 mg. of starting material are first obtained, and then 130 mg. of hydrolysis product as a viscous oil with a unitary $R_f$ (0.25 with ethyl acetate as running agent). When it is allowed to stand for several days, it solidifies into colorless crystals. Optical rotation, $[\alpha]_D^{23}=+133°$ (c.=1.05 in acetone): IR absorption spectrum (liquid): $\nu$ (OH) 3400 cm.$^{-1}$ (broad), no band in the 6$\mu$ range. IR absorption spectrum and $R_f$ value agree with those of the methyl glycoside from Venturicidin B (see below). Nuclear magnetic resonance spectrum in CDCl$_3$ (60 mHz.): $\delta$ 1.29 p.p.m. (d, J=6.5 Hz., 3 H); 1.4–2.4– p.p.m. (m, 2 H); 332 p.p.m. (s, 3 H); 4.75 p.p.m. (dd, $J_{1e,2e}$=45 Hz., $J_{1e,2e}$ about 1.5 Hz., 1 H). Signals of about 5 more H in poorly dissolved groups between $\delta$ 2.8 and 4.0 p.p.m.

(b) By methanolysis of Venturicidin B.—5.5 ml. of 1.3 N-absolute methanolic hydrochloric acid are added to 850 mg. of Venturicidin B in 50 ml. of absolute methanol. The batch is allowed to stand at room temperature for 5 hours, after which no starting material can be detected. The solution is evaporated under reduced pressure at 25° C., and the residue chromatographed on 80 g. of silica gel. Ethyl acetate elutes 625 mg. of a non-unitary product with $R_f$ about 0.6 (thin-layer chromatography with ethyl acetate) which cannot be distinguished from the corresponding fractions resulting from the methanolysis of Venturicidin A. With ethyl acetate+methanol (8:2) 180 mg. of a colorless oil are obtained; $R_f$=0.25, unitary. Optical rotation, $[\alpha]_D^{23}=+158°$ (c.=1.11 in acetone). The nuclear magnetic resonance spectrum is identical with that of the product obtained by alkaline hydrolysis of the carbamate (see above).

(5) 2-desoxy-D-rhamnose 85 mg. of α-methyl-2-desoxy-D-rhamnoside (from Venturicidin A, see above, process (a)) are heated at 80–85° C. for an hour and a half with 10 ml. of 0.5 N-sulfuric acid. The sulfuric acid is then neutralized with barium carbonate, the batch filtered and evaporated under reduced pressure. The residue is dissolved in 5 ml. of acetone, filtered again and evaporated. There are obtained 80 mg. of a pale-yellowish, clear syrup. Further purification is performed by chromatography on silica gel with ethylacetate+methanol (8:2). The viscous eluate is unitary according to thin-layer chromatography (ethyl acetate+methanol 8:2, $R_f$=0.30). IR absorption spectrum (liquid): no band in the 6$\mu$ range $[\alpha]_D^{23}=+60.8°$ (c.=0.977 in acetone); +19.9° (c.=0.993 in water, final value after 90 minutes). By hydrolyzing the glycoside from Venturicidin B, the same sugar is obtained (IR absorption spectrum and $R_f$ value identical).

EXAMPLE 2

3 g. of Venturicidin X are hydrogenated in 150 ml. of methanol by means of 750 mg. of 10% strength palladium charcoal, in an atmosphere of hydrogen. The hydrogenation ceases after 2 hours and 237 ml. of hydrogen (20° C., 725 mm.) have been consumed, corresponding to about 2 mols. The catalyst is filtered off, and the solution is evaporated and the residue chromatgraphed on 30 g. of silica gel. 2.56 g. of the tetrahydro-derivative of Venturicidin X are eluted with ethyl acetate in the form of a colorless substance which on wetting with ether crystallises. The properties of the compound are given in the general part of the description.

EXAMPLE 3

100 mg. of Tetrahydro-Venturicidin X are allowed to react for 6 hours at room temperature with 2 ml. of acetic anhydride and 2 ml. of pyridine. The solution is then evaporated to dryness. 84 mg. of a colorless oil are obtained by chromatography on 10 g. of silica gel, using chloroform-ethyl acetate (4:1) as the eluting agent. The properties of this acetylation product of Tetrahydro-Venturicidin X are given in the general part of the description.

EXAMPLE 4

4.31 g. of the evaporation residue from fractions 265–308 according to Example 1 are chromatographed on 350 g. of silica gel. With chloroform+ethyl acetate (1:1), 1.76 g. of Venturicidin X are eluted. Elution with ethyl acetate yields 1.23 g. of chromatographically unitary Venturicidin B. Recrystallization from ethyl acetate+petroleum ether gives a colorless powder which melts at 145–149° C. Optical rotation, $[\alpha]_D^{23} = +100°$ (c.=0.847 in chloroform). IR spectrum in potassium bromide, see FIG. 8, nuclear magnetic resonance spectrum in CDCl$_3$, see FIG. 9.

$C_{42}H_{70}O_{11}$.—Calculated (percent): C, 67.16; H, 9.40. Mols weight, 751. Found (percent): 66.86; H, 9.29. Mols weight, 733.

The molecular weight is determined steam pressure-osmometrically in methylene chloride.

EXAMPLE 5

200 mg. of Venturicidin B are acetylated with acetic anhydride in the same manner as described in Example 1 (1) for Venturicidin A. The crude tri-O-acetyl-Venturicidin B is purified by chromatography on silica gel and elution with ethyl acetate. An amorphous, colorless powder is obtained which melts at 150–152° C. Its nuclear magnetic resonance spectrum in CDCl$_3$ displays signals, inter alia, at $\delta=1.99$ p.p.m. (s, 3 H); 2.01 p.p.m. (s, 3 H) and 2.02 p.p.m. (s, 3 H).

$C_{48}H_{76}O_{14}$.—Calculated (percent): C, 65.73; H, 8.73. Found (percent): C, 65.92; H, 8.54.

EXAMPLE 6

3 mg. of Venturicidin A in 2 ml. of ethanol+water (1:1) and a few drops of saturated barium hydroxide solution are allowed to stand at room temperature. Barium carbonate slowly settles out. After 24 hours, thin-layer chromatography does not reveal any starting material, but a new spot appears which displays the properties of Venturicidin B, and smaller quantities of by-products having a lower $R_f$ value.

EXAMPLE 7

100 mg. of Venturicidin X are dissolved in 1 ml. of ethyl Cellosolve containing 10% of Triton® X–100, and the solution is made up to 1 liter with distilled water. The solution serves as a spraying solution, for example for combating infections of Botrytis cinerea on vines.

Following a spray against grape berry moth (second generation) a section of a vineyard is sprayed four times in 2 weeks' intervals with the above spraying solution. Comparison with an untreated control section shows a good effect against Botrytis cinerea.

EXAMPLE 8

A test solution of the active substance is obtained by dissolving 10% of Venturicidin B in ethyl Cellosolve containing 10% of Triton X–100, and adjusted to the desired concentration by adding distilled water.

Young leaves of about the same size on vine shoots of the "Riesling-Sylvaner" kind are sprayed with the test solution and allowed to dry, and others of the same kind are put into a solution of the active substance and left there for 48 hours. The leaves so treated are then infested with an aqueous suspension of conidia of Botrytis cinerea Pers. and incubated at room temperature in a moisture chamber.

After 4 days the percentage of leaf surface darkened as a result of the infestation with pathogen is estimated. The results are shown in the table below, a 50% copper oxychloride preparation being included as a standard.

TABLE

Effect of Venturicidin B against Botrytis cinerea

| Substance tested | Concentration used | Percent effect | |
|---|---|---|---|
| | | Surface treatment | Uptake through stem |
| Venturicidin B | 0.01 | 82 | 41 |
| | 0.001 | 41 | 13 |
| | 0.0001 | 13 | 0 |
| Copper oxychloride | 0.3 | 67.4 | 0 |
| Control | | 0 | 0 |

EXAMPLE 9

With a 0.1% aqueous suspension of Venturicidin X, rice plants grown in a hot house are sprayed once prophylactically.

Two days afterwards the plants are infested with a suspension of conidia of Piricularia oryzae Bri. et Cav., the pathogen causing rice blast disease, and examined for fungi seven days later.

As compared with the untreated controls, the sprayed plants showed but 15% infestation.

We claim:

1. A mixture of the antibiotics Venturicidin X and Venturicidin B, said Venturicidin X being white; neutral; soluble in methanol, ethanol, acetone, ethyl acetate, chloroform, methylene chloride, having a molecular weight 701 (vapor pressure osmometry method, in methylene chloride), elementary analysis: C=66.35%, H=9.18%, O(calc.)=24.90%; specific rotation $$[\alpha]_{578}^{23} = -61.5° \text{ (in chloroform)}$$

Figure 1:
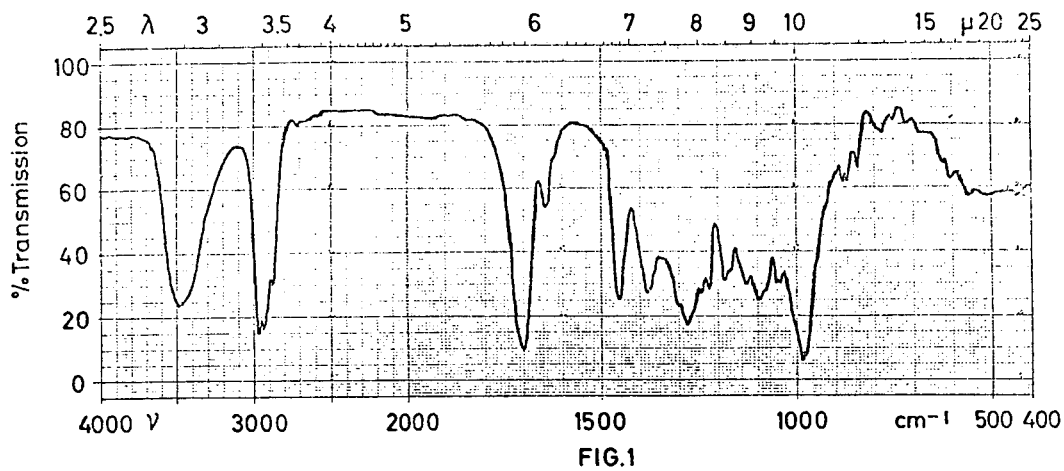
FIG. 1 shows the IR-spectrum in KBr of Venturicidin X.
Figure 3:
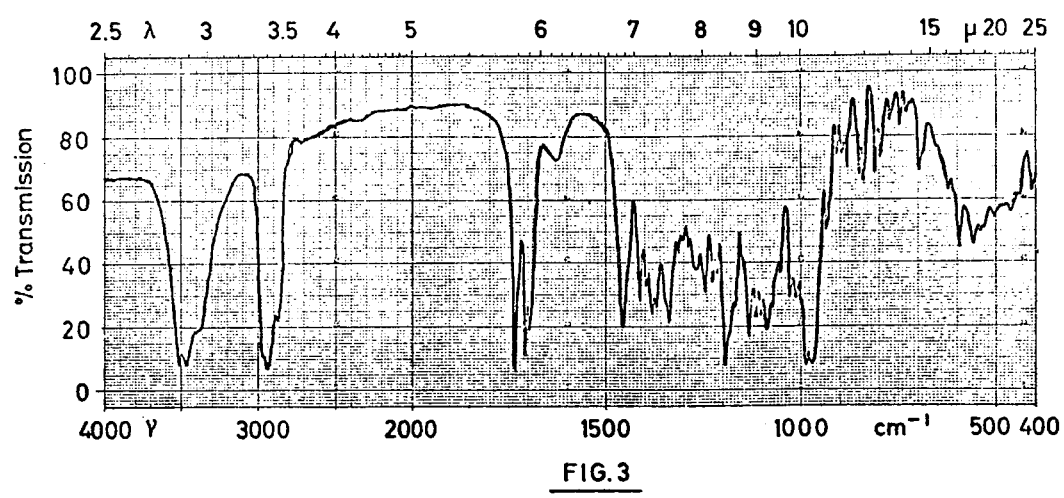
FIG. 3 shows the IR-spectrum in KBr of Tetrahydro-Venturicidin X.
Figure 8:
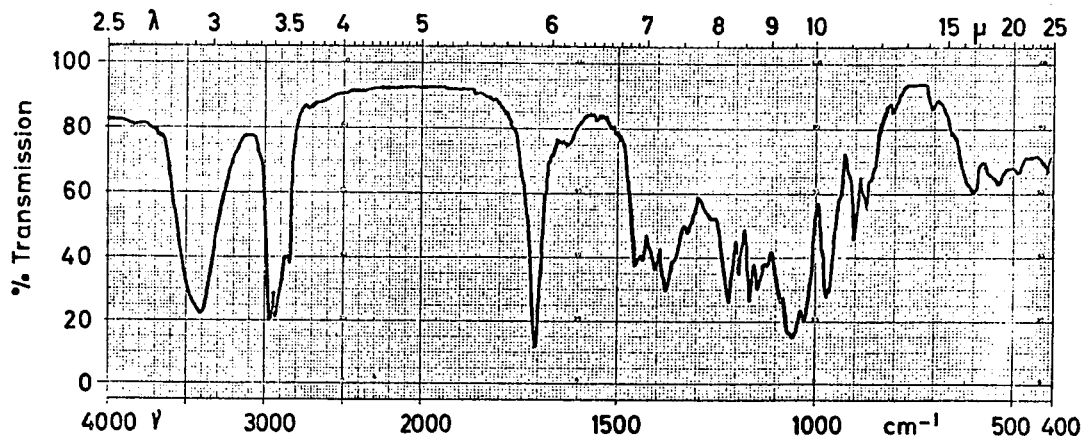
FIG. 8 shows the IR-spectrum in KBr of Venturicidin B.
Figure 7:
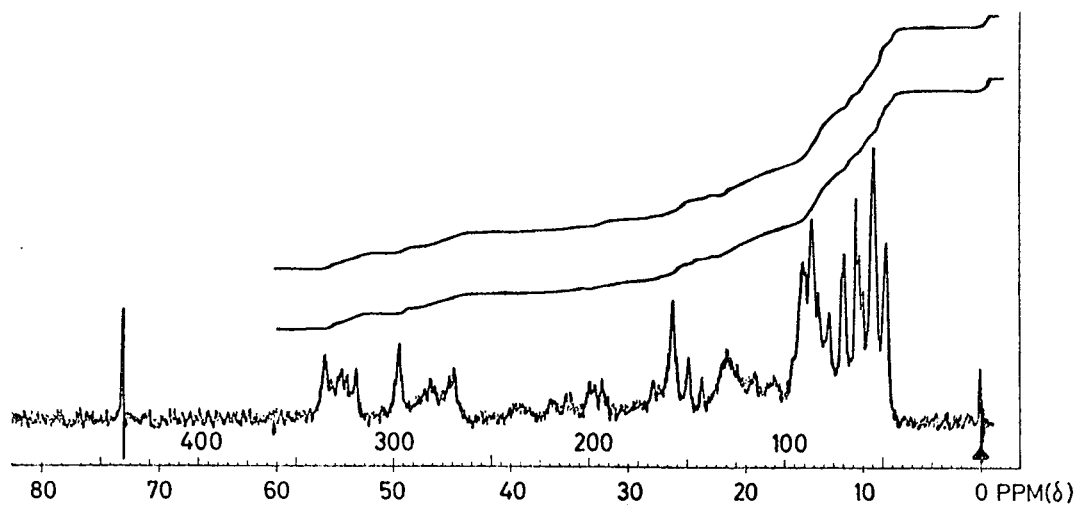
FIG. 7 shows the NMR-spectrum in CDCl$_3$ of Venturicidin A.
Figure 9:
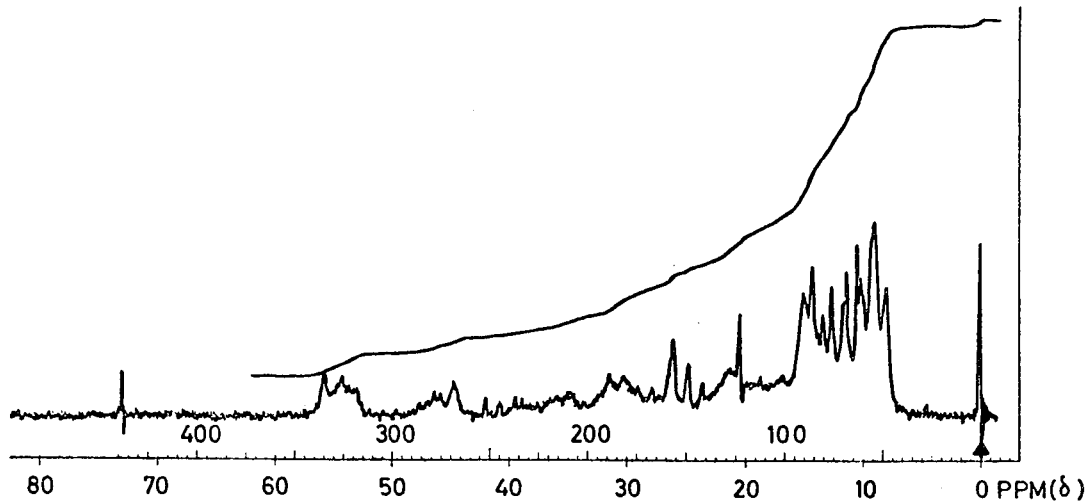
FIG. 9 shows the NMR-spectrum in CDCl$_3$ of Venturicidin B.

UV maxima (in ethanol) at $\lambda=220$ nm. (log $\epsilon=4.47$; shoulder), $\lambda=226$ nm. (log $\epsilon=4.50$), $\lambda=232.5$ nm. (log $\epsilon=4.47$), $\lambda=241$ nm. (log $\epsilon=4.25$), 295 nm. approx. (log=2.53, shoulder); IR spectrum of FIG. 1; and yielding a tetrahydro derivative of melting point 156–157° C., and said Venturicidin B being white; neutral; soluble in ethyl acetate but precipitated therefrom with petroleum ether; having a molecular weight 733 (vapor pressure osmometry method, in methylene chloride); elementary analysis C=66.86%, H=9.29%; O(calc.)=23.85%; melting point 145–149° C.; specific rotation $[\alpha]_D^{23} = +100°$ (in chloroform); the NMR spectrum (in CDCl$_3$) of FIG. 9; IR bands (in potassium bromide) of FIG. 8; and yielding a tri-O-acetyl derivative of melting point 150–152° C.

2. The antibiotic Venturicidin X, said Venturicidin X being white; neutral; soluble in methanol, ethanol, acetone, ethyl acetate, chloroform, methylene chloride; having a molecular weight 701 (vapor pressure osmometry method, in methylene chloride), elementary analysis C=66.35%, H=9.18%, O(calc.)=24.90%; specific rotation $$[\alpha]_{578}^{23} = -61.5° \text{ (in chloroform)}$$

UV maxima (in ethanol) at $\lambda=220$ nm. (log $\epsilon=4.47$; shoulder), $\lambda=226$ nm. (log $\epsilon=4.50$), $\lambda=232.5$ nm. (log $\epsilon=4.47$), $\lambda=241$ nm. (log $\epsilon=4.25$), 295 nm. approx. (log $\epsilon=2.53$, shoulder); IR spectrum of FIG. 1; and yielding a tetrahydro derivative of melting point 156–157° C.

3. The antibiotic Venturicidin B, said Venturicidin B being white; neutral; soluble in ethyl acetate but precipitated therefrom with petroleum ether; having a molecular weight 733 (vapor pressure osmometry method, in methylene chloride); elementary analysis: C=66.86%, H=9.29%; O(calc.)=23.85%; melting point 145–149° C.; specific rotation $[\alpha]_D^{23} = +100°$ (in chloroform); the NMR spectrum (CDCl$_3$) of FIG. 9; IR bands (in potassium bromide) of FIG. 8; and yielding a tri-O-acetyl derivative of melting point 150–152° C.

4. A pharmaceutical preparation comprising essentially an antifungally effective amount of a member selected from the group consisting of Venturicidin X, Venturicidin B and a mixture of Venturicidin X and Venturicidin B, said Venturicidin X and said Venturicidin B being as defined in claim 1.

5. Tetrahydro-Venturicidin X, a colorless crystalline substance of melting point 156–157° C., showing in the elementary analysis C=67.25%, H=9.90, O(calc.) =22.85%, said Venturicidin X being as defined in claim 2.

Figure 5:
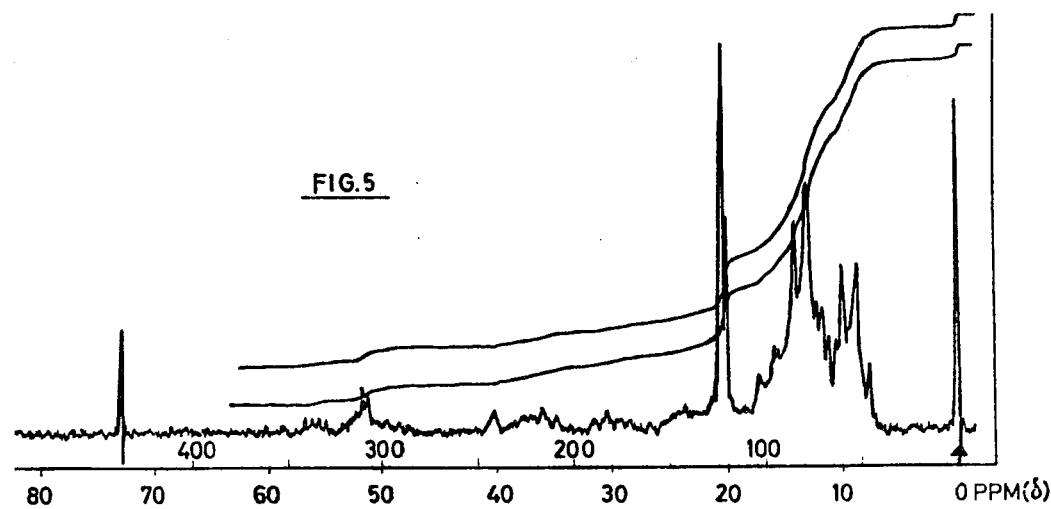
FIG. 5 shows the NMR-spectrum in CDCl$_3$ of acetylated Tetrahydro-Venturicidin X.
Figure 4:
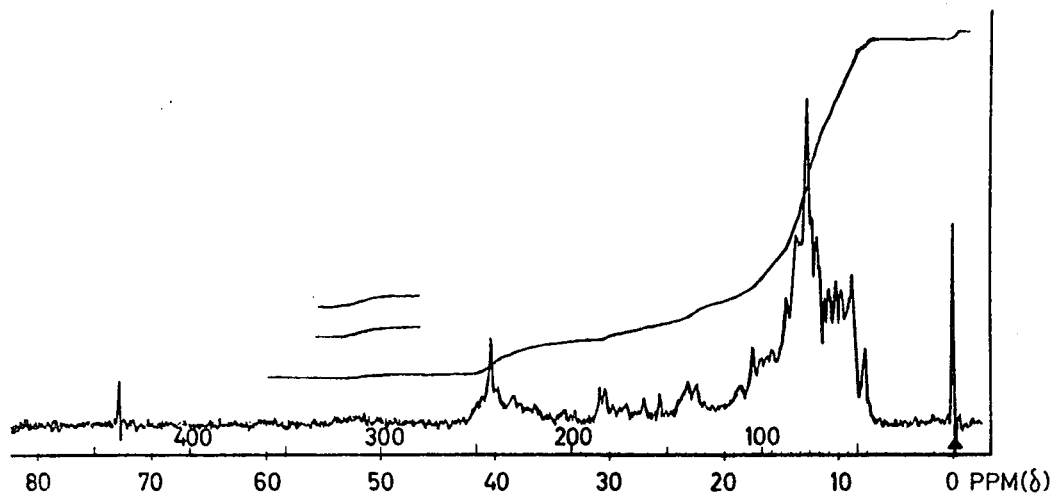
FIG. 4 shows the NMR-spectrum in CDCl$_3$ of Tetrahydro-Venturicidin X.
Figure 2:
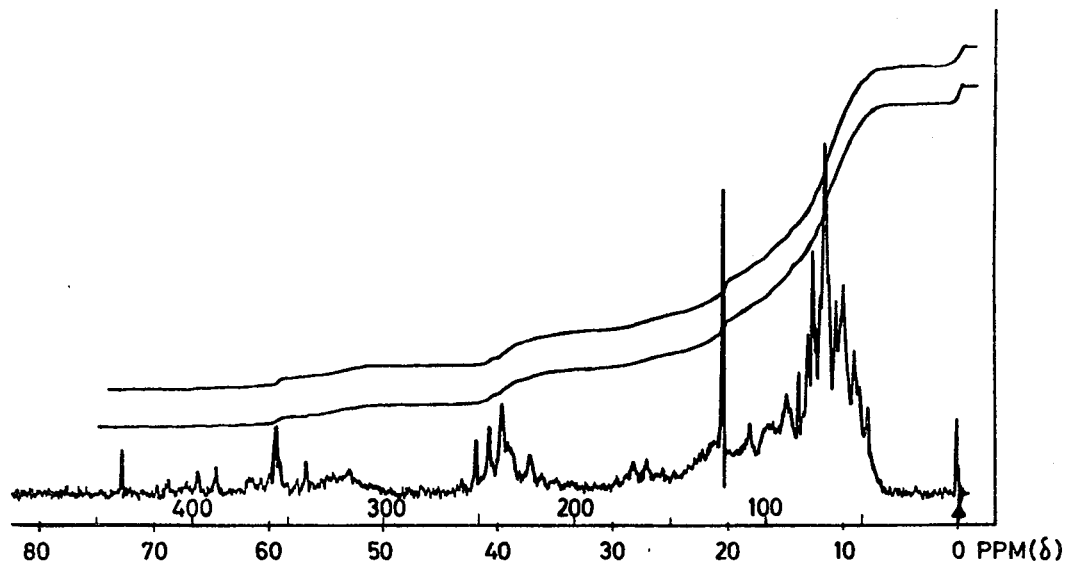
FIG. 2 shows the NMR-spectrum in CDCl$_3$ of Venturicidin X.
Figure 6:
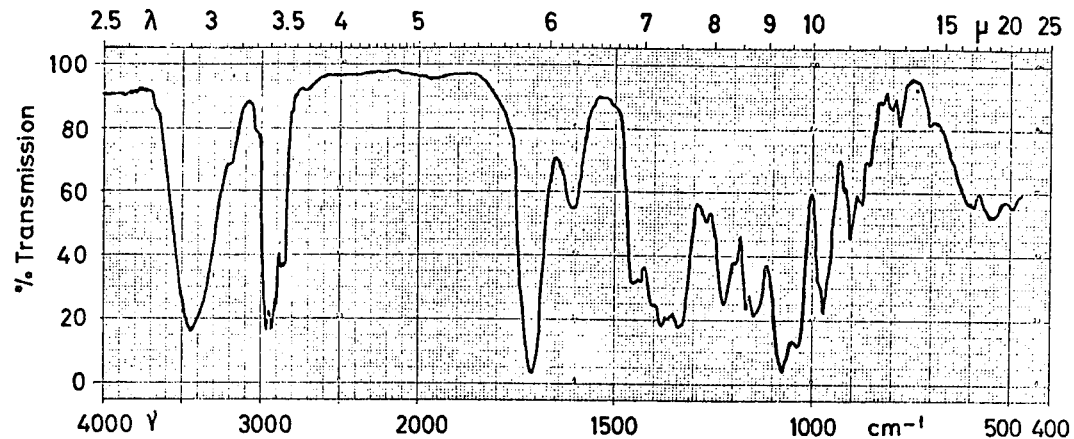
FIG. 6 shows the IR-spectrum in KBr of Venturicidin A.

6. The acetylation product of tetrahydro-Venturicidin X, a colorless substance showing in deutero-chloroform the NMR spectrum of FIG. 5 and in the IR spectrum in chloroform bands at 3460, 1733, 1705 (shoulder), 1457 and 1370 cm.$^{-1}$, said Venturicidin X being as defined in claim 2.

7. The tri-O-acetyl derivative of Venturicidin B, a colorless substance of the formula $C_{48}H_{76}O_{14}$ melting at 150–152° C., said Venturicidin B being as defined in claim 3.

8. A method for combating plant-pathogenic fungi which comprises applying to said fungi a phytopathogenically effective amount of a member selected from the group consisting of Venturicidin X, Venturicidin B and a mixture of Venturicidin X and Venturicidin B, said Venturicidin X and said Venturicidin B being as defined in claim 1.

9. Process for the manufacture of antibiotics selected from the group consisting of Venturicidin X, Venturicidin B and a mixture of Venturicidin X and B as defined in claim 1, wherein the strain *Streptomyces aureofaciens* Tü 342 is cultured under aerobic conditions in an aqueous nutrient solution containing a source of carbon and nitrogen as well as inorganic salts, until the solution shows a significant antibiotic effect, and are thereafter separated from the culture filtrate by means of an organic solvent.

References Cited

UNITED STATES PATENTS

| | | | |
|---|---|---|---|
| 2,482,055 | 9/1949 | Duggar | 424—227 |
| 2,878,289 | 3/1959 | McCormick et al. | 424—227 |
| 3,123,530 | 3/1964 | Rhodes et al. | 424—122 |

ALBERT T. MEYERS, Primary Examiner

D. M. STEPHENS, Assistant Examiner